350-360 SR SEARCH ROOM
XR 3,879,630

United Stat... ...
Halperin et al. SUBSTITUTE FOR MISSING XR
[11] 3,879,630
[45] Apr. 22, 1975

[54] REFLECTIVE DEFORMOGRAPHIC TARGET ASSEMBLY

[75] Inventors: Bernard I. Halperin, Glen Aubrey; Gerald W. Manley, Vestal; Neil M. Poley, Kingston, all of N.Y.

[73] Assignee: International Business Machines Corporation, Armonk, N.Y.

[22] Filed: Apr. 1, 1974

[21] Appl. No.: 456,714

[52] U.S. Cl. ................ 313/394; 313/397; 313/465; 313/473; 350/161
[51] Int. Cl. ............................................ H01j 29/10
[58] Field of Search ........... 313/394, 397, 465, 473; 178/7.3 D, 7.5 D, 7.87; 350/161

[56] References Cited

UNITED STATES PATENTS

| | | | |
|---|---|---|---|
| 3,626,084 | 12/1971 | Wohl et al. | 350/161 X |
| 3,676,588 | 7/1972 | Kozol et al. | 178/7.5 D |

OTHER PUBLICATIONS

Ross et al., "Deformographic Material," IBM Technical Disclosure Bulletin Vol. 13, No. 10, March 1971 p. 2,948.

Worl, "Deformographic Film With Barrier Layer in Target Assembly" IBM Technical Disclosure Bulletin Vol. 15, No. 5, Oct. 1972, p. 1677.

Yetter, "Applying Reflective Conductive Coating to a Deformable Polymer," IBM Technical Disclosure Bulletin, Vol. 16, No. 7, December 1973 pp. 2045, 2046.

*Primary Examiner*—James B. Mullins
*Attorney, Agent, or Firm*—Norman R. Bardales

[57] ABSTRACT

An intermediary gold layer is disposed between the deformographic material layer and conductive silver layer of a reflective deformographic target assembly used in a deformographic storage display tube. The gold layer inhibits the degradation of the reflecting characteristics of the target when it is subsequently subjected to high temperatures associated with the tube fabrication and assembly process.

10 Claims, 2 Drawing Figures

REFLECTIVE DEFORMOGRAPHIC TARGET ASSEMBLY

CROSS-REFERENCE TO RELATED APPLICATIONS

Applications, Ser. No. 398,288, filed Sept. 17, 1973, entitled "Target Assemblies For Deformographic Storage Display Tubes," Robert J. Wohl, and Ser. No. 279,672, filed July 16, 1973, entitled "Color Deformographic Storage Target," John Joseph Dalton and Neil Myron Poley, a co-inventor herein, and both assigned to the common assignee herein, describe deformographic storage display tubes using deformographic target assemblies. More particularly, in Application Ser. No. 398,288, there is described a barrier layer which prevents cathode poisoning by the deformographic member of the target and which is composed of materials described as VAC SEAL (registered trademark of the General Electric Company), or a polyvinyl formal such as FORMVAR (registered trademark of Shawinigan Products Corp.), or polymer films such as PARYLENE (tradename of the Union Carbide Corporation), or inorganic films such as silicon dioxide. In Application Ser. No. 379,672 a target assembly is described in which the deformographic material is sandwiched between two dielectric members in a structure that provides a Farbry-Perot type of interference transmission so that a light beam incident to the target is broken into its component colors.

BACKGROUND OF THE INVENTION

1. Field of the Invention

This invention relates to a target assembly for deformographic display tubes and in particular for reflective type target assembly for such tubes.

2. Description of the Prior Art

Target assemblies for deformographic display tubes are described, for example, in the aforementioned two cross-referenced applications and the following references: U.S. Pat. Nos. 3,626,084 and 3,676,588, which are assigned to the common assignee herein; and publications such as "Deformographic Material" by R. M. Ross et al; "Deformographic Film With Barrier Layer In Target Assembly" by R. J. Wohl; and "Applying Reflective Conductive Coating To A Deformable Polymer" by L. R. Yetter appearing in the International Business Machines Technical Disclosure Bulletin, Vol. 13, No. 10, Mar. 1971, page 2,948; Vol. 15, No. 5, October 1972, page 1,677; and Vol. 16, No. 7, December 1973, pages 2,045–2,046; respectively.

Generally, heretofore in the prior art it has been suggested to make deformographic target assemblies by affixing a conductive electrode layer to the deformable member. The conductive coating materials suggested in the prior art for reflective type systems are silver and aluminum. While gold may also be used, it generally has inferior reflective characteristics and is thus more suitable for transmissive type targets, in which case it is formed as a transparent film or layer. For further information regarding deformographic target assemblies having a conductive electrode on the deformographic member and a spaced conductive electrode see the aforementioned U.S. Pat. Nos. 3,676,588 and 3,626,084, respectively.

Other examples of transparent type target assemblies are the aforementioned Ross et al and Wohl publications. The aforementioned Yetter publication describes a reflective deformographic target assembly in which a silver layer, which is utilized as the reflective conductive member, is affixed to the deformable member. The Yetter reference further describes the provision of a protective outer thin film, e.g., 50 to 75 angstrom, of gold to the exposed surface of the silver layer.

In certain applications in the prior art, it has been found that for reflective type targets using a silver reflective layer affixed to the deformable member, the reflecting characteristics of the target deleteriously degrade when the target is subsequently mounted in the tube envelope of which it will be a part and is thereafter subjected to the elevated temperatures used in the vacuum-bake process associated with the formation of the tube assembly prior to sealing.

SUMMARY OF THE INVENTION

It is an object of this invention to provide a reflective target assembly for a deformographic storage display tube which mitigates degradation of the target's reflective characteristics when subsequently subjected to elevated temperatures.

It is another object of this invention to provide a reflective target assembly for a deformographic storage tube which has highly reliable reflective characteristics, and/or which has reflective characteristics which will not substantially degrade when subjected to elevated temperatures used in the associated tube assembly processes.

According to one aspect of the invention, there is provided in a reflective deformographic storage tube target having a deformographic material layer, the combination of a conductive outer silver layer, and an intermediary gold layer disposed between the deformographic material layer and the silver layer to inhibit the degradation of the reflecting characteristics of the target when subsequently subjected to high temperatures during the associated tube fabrication process.

It should be noted that none of the structures described in the aforementioned references and cross-referenced applications provide an intermediary gold layer between the silver and deformable members of the deformographic targets described therein and/or for the purpose of preventing degradation of the reflective characteristics of the target when subsequently subjected to the high temperatures used in the associated tube fabrication process.

The foregoing and other objects, features and advantages of the invention will be apparent from the following more particular description of the preferred embodiments of the invention, as illustrated in the accompanying drawing.

BRIEF DESCRIPTION OF THE DRAWING

In the figures, like elements are designated with similar reference numerals.

DESCRIPTION OF THE PREFERRED EMBODIMENT

Figure 1:
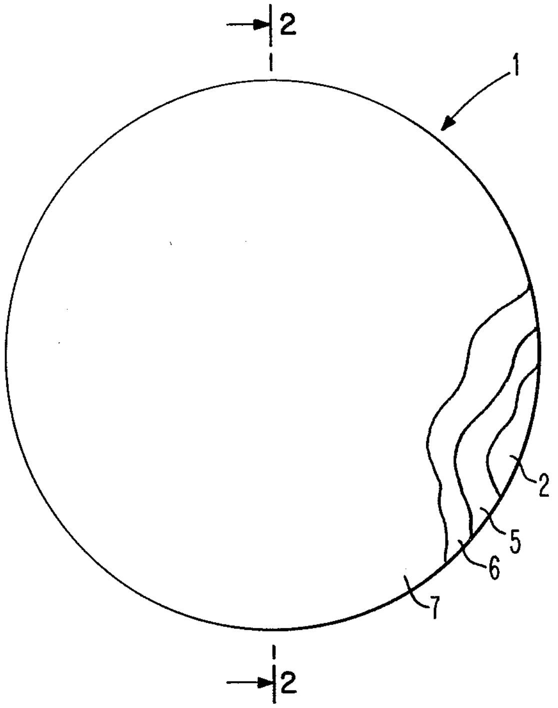
FIG. 1 is a schematic view, partly broken away, of a preferred embodiment of a deformographic target assembly of the present invention.
Figure 2:
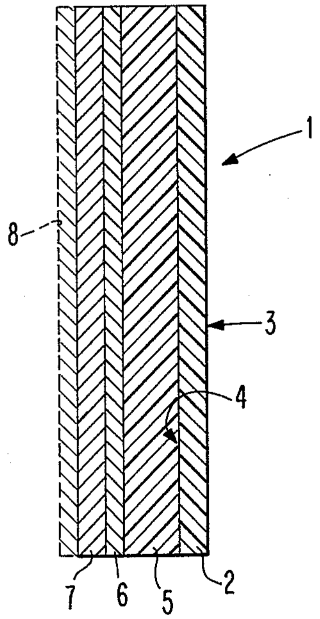
FIG. 2 is a cross sectional view of the target assembly of FIG. 1.

Referring now to FIGS. 1 and 2, there is shown a preferred embodiment of the invention of the reflective target assembly 1 for a deformographic storage display tube, not shown. It includes a relatively non-deformable, extended and electrostatically chargeable dielectric substrate 2 such as mica, for example, that is a generally planar or sheet-like member. Member 2 has a surface 3 which faces the gun side of the tube, not shown, in which the target assembly 1 will be incorporated. Member 2 stores the electron charge pattern which is used in the operation of the tube.

Mounted directly on the opposite surface 4 of member 2 is a deformable solid dielectric member 5 in the form of a co-extensive film or layer, sometimes referred to herein as a deformographic film. The film 5 is preferably a silicone polymer. Particularly suitable for this use and available in their uncured states are silicone polymers referred to by the manufacturer as XR-63-493, Sylgard 51, and XZ82219. The formation of member 5 onto member 2 is well known in the art, cf. for example, U.S. Pat. No. 3,445,507 of J. P. Gilvey et al, entitled "Mica Membrane Mounting Structure for Cathode-Ray Storage Tube," and which is assigned to the common assignee herein.

In accordance with the principles of the present invention, an intermediary gold member 6 is mounted on top of the member 5 in the form of a co-extensive layer or film such as by an evaporation process. The layer 6 may be continuous or alternatively it may have discontinuities, as we have found that discontinuities in the layer 6 do not adversely affect the target's optical and/or electrical characteristics. For optimum results, the thickness of layer 6 is preferably in the range of 5 to 15 Angstroms.

On top of the intermediary gold layer 6 is mounted the reflective conductive silver member 7 formed as a co-extensive layer or film such as by an evaporation process. Member 7 has a thickness in the range of 300 to 800 Angstroms and is referred to also as the reference electrode of the target assembly 1. Both layers 6 and 7 are compatibly deformable with the deformographic member 5.

We have found that the reflective characters of target assemblies formed with the intermediary gold layer 6 disposed in contacting relationship between the deformable layer 5 and silver electrode layer 7 do not substantially degrade when subjected to elevated temperatures, e.g., 150°C, such as is the case for target assemblies in which the silver layer is directly mounted on the deformable material. By way of comparison, there is indicated in the following Table I test data for two typical specimens, referred to as I and II herein, the former having an intermediary gold layer in accordance with the principle of the present invention and the latter having the silver layer directly affixed to the deformable layer.

TABLE I

| | |
|---|---|
| Specimen I | |
| Deformable material XZ82219 polymer | 1.25 mils |
| Silver layer | 400 Angstroms |
| Gold intermediate layer | 8 Angstroms |
| Before temperature exposure: | |
| Optical Density at 6300 Angstroms | 1.53 |
| After temperature exposure: | |
| Optical density at 6300 Angstroms | 1.34 |
| Temperature exposure | 150°C for 3 hours |
| Specimen II | |
| Deformable material XZ82219 polymer | 1.25 mils |
| Silver layer | 400 Angstroms |
| Before temperature exposure: | |

TABLE I-Continued

| | |
|---|---|
| Optical density at 6300 Angstroms | 1.53 |
| After temperature exposure: | |
| Optical density at 6300 Angstroms | 0.58 |
| Temperature exposure | 150°C for 3 hours |

An exemplary method of forming the gold and silver layers will next be described. With a deformable layer 5 of the XZ82219 polymer, for example, assembled to the mica substrate 2, the exposed surface of the deformable layer is first prepared by a glow discharge technique, using a discharge voltage of 1,200 volts in a partial vacuum of 80 microns for twenty seconds. Next, the gold is evaporated on the exposed surface of the deformable layer 5 at a pressure of $5\times10^{-6}$ Torr to a thickness of 8 Angstroms. Thereafter, the silver is evaporated at the same pressure to a thickness of 400 Angstroms.

If desired, an outer compatibly deformable protective gold layer 8 shown in phantom outline form for sake of clarity in FIG. 2, in the range of 10 Angstroms may be co-extensively formed, e.g., by evaporation, in contacting relationship with the outer surface, i.e., on top of the silver member 7.

While an optimum thickness range of the silver layer 7 has been described, it should be understood that the invention may be practiced with other silver thicknesses. For example, in the range 300 – 800 Angstroms, it has been found that the target reflects 90 percent or better. If desired, however, the silver thickness could be less than 300 Angstroms, if reflections of less than 90 percent are tolerable. Likewise, for silver thicknesses over 800 Angstroms it has been found that the silver layer develops flaws such as cracking and, hence, thicknesses over 800 Angstroms are generally not desirable. However, if these flaws can be tolerated, then thicknesses greater than 800 Angstroms can be used.

While the invention has been particularly shown and described with reference to a preferred embodiment thereof, it will be understood by those skilled in the art that various changes in form and details may be made therein without departing from the spirit and scope of the invention.

I claim:

1. In a reflective deformographic storage tube target having a deformographic material layer, the combination comprising at least:

a compatibly deformable conductive outer silver layer, and an intermediary compatibly deformable gold layer disposed between said deformographic material layer and said silver layer to inhibit the degradation of the reflecting characteristics of said target when subsequently subjected to high temperatures during the associated tube fabrication process.

2. A target according to claim 1 wherein said gold layer is deposited by evaporation at a pressure of $5\times10^{-6}$ Torr.

3. A target according to claim 1 wherein said gold layer has a predetermined thickness in the range of 5 to 15 Angstroms.

4. A target according to claim 1 wherein said silver layer has a predetermined thickness in the range of 300 to 800 Angstroms.

5. A reflective deformographic storage tube target comprising in combination:

electrostatically chargeable nonconductive first member means, deformable solid dielectric second member means having a side in contacting relationship with said first member, compatibly deformable silver third member means, and compatibly deformable intermediary gold fourth member means disposed in contacting relationship with and intermediate said second and third member means.

6. A target according to claim 5 wherein said fourth member means is in the thickness range of 5 to 15 Angstroms.

7. A target according to claim 6 wherein said third member means is in the thickness range of 300 to 800 Angstroms.

8. A target according to claim 6 wherein said first member means is mica, and said second member means is a silicone polymer.

9. A target according to claim 5 further comprising a compatibly deformable gold fifth member means disposed in contacting relationship with the outer surface of said third member means.

10. A reflective deformographic storage tube target of the type having a deformographic material layer and a compatibly deformable conductive outer silver layer characterized in that:

a gold layer deformable compatibly with the deformographic and silver layers is disposed between said deformographic material layer and said silver layer to inhibit the degradation of the reflecting characteristics of said target when subjected to high temperatures.

* * * * *